Sept. 20, 1927.

J. W. CAUSEY

SAW GUIDE

Filed Feb. 16, 1927

1,642,838

INVENTOR.
Joseph W. Causey,
BY
Hood + Hahn.
ATTORNEYS

Patented Sept. 20, 1927.

1,642,838

UNITED STATES PATENT OFFICE.

JOSEPH W. CAUSEY, OF ELECTRIC MILLS, MISSISSIPPI.

SAW GUIDE.

Application filed February 16, 1927. Serial No. 168,542.

My invention relates to improvements in guides for band saws and is particularly applicable to band saw mills as a top guide for the saw.

It is one of the objects of my invention to provide a guide which, while properly holding the saw in position, will not have a tendency to heat the saw to a great extent and will at the same time, when the saw tends to run back on the wheel under stress, give with the saw so that the back edge of the saw will not be injured.

For the purpose of disclosing my invention I have illustrated one embodiment thereof in the accompanying drawings in which Fig. 1 is a perspective view of a band saw mill showing my guide in position;

In the embodiment illustrated the band saw mill is provided with a supporting arm 1, extending from the frame of the mill and in a position to support the guide 2 above the cutting point of the saw.

Figure 1:
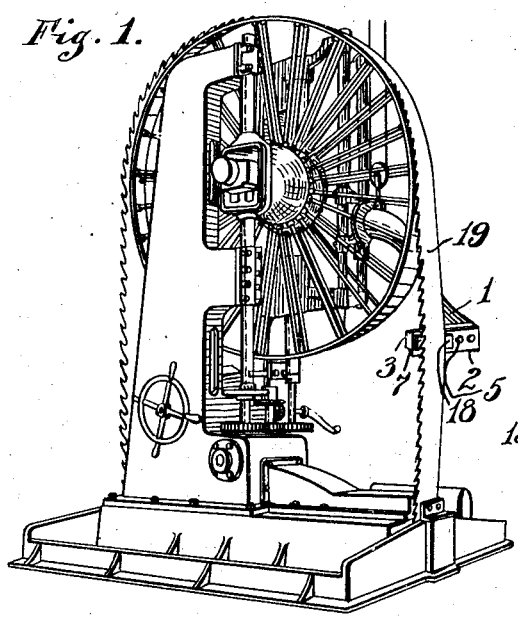
Figure 2:
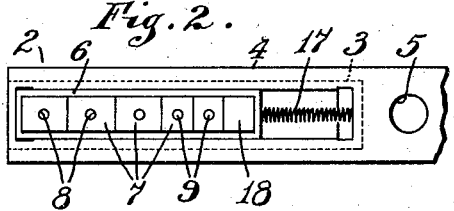
Fig. 2 is a front elevation of the guide.
Figure 3:
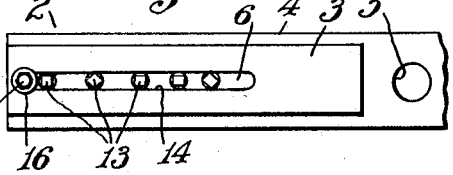
Fig. 3 is a rear elevation thereof.
Figure 4:
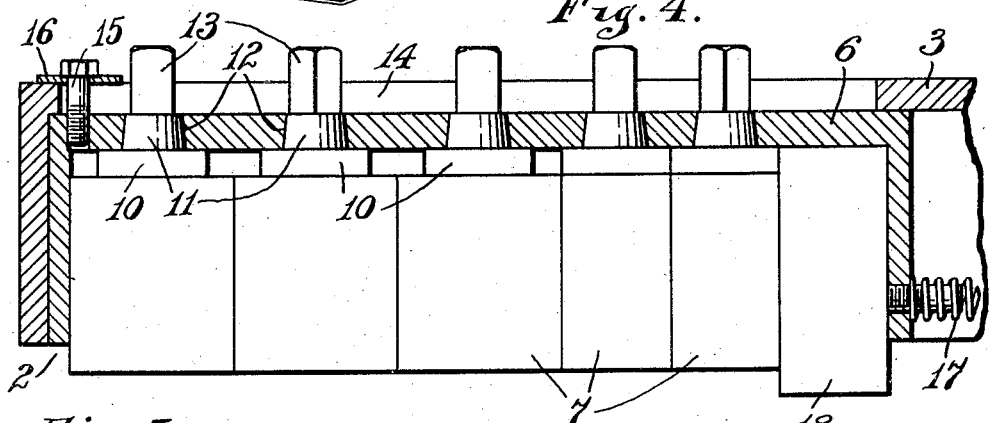
Fig. 4 is a detail longitudinal section.
Figure 5:
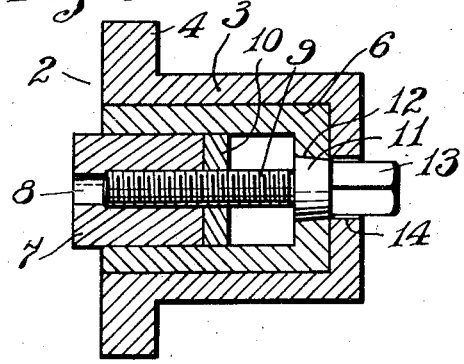
Fig. 5 is a detail transverse section.

The guide 2, as illustrated in Figs. 2 to 4, comprises an open faced housing 3 extending rearwardly from a front plate 4. This plate is provided at one end with suitable bolt openings 5 by which it may be secured in position on the arm 1. A guide block holder 6 is mounted within this housing and is adapted to contain a plurality of guide blocks 7. Each of these blocks is centrally bored as at 8 to receive an adjusting screw 9 which screw passes through the back nut 10 bearing on the rear face of the block. The screw at its rear end is provided with a tapered shoulder 11 seating in a tapered opening 12 in the rear wall of the block holder 6 and this screw at its rear end is provided with a squared shank 13 adapted to project through an elongated slot 14 in the housing 3 so that access to the screw for the purpose of adjusting the blocks and due to the elongated slot the block holder 6 will be permitted to slide transversely in the housing. One end of the holder 6 is provided with a guide screw 15 which is fastened into the rear wall of the holder 6 and projects through the slot 14, a washer 16 being interposed between the head of the screw and the rear wall of the housing 3. The holder is maintained in its projected position, that is the position toward the toothed edge of the saw, by means of a coiled spring 17 interposed between the side wall of the housing and a side wall of the holder 6. The rearmost block 18 in the holder is made longer than the remaining blocks 7 so that its side face will engage the back edge of the band saw 19.

In operation the blocks 7 are adjusted, in or out, to bear against the side face of the saw 19 and the block 18 is set so that when the holder 6 is moved to its extreme forward position under the influence of the coiled spring 17 the side face thereof will be adjacent the back of the saw. If during the sawing operation the saw tends to run backward, the back edge being in contact with the block 18, the holder will give to the saw, but at the same time exert a pressure forward and as soon as the pressure of the material to be cut is relieved, the guide will center the saw on the wheel under the influence of the coiled spring 17. By this arrangement the saw will not come in contact with metal parts to become extremely heated or damaged thereby.

The blocks 7 and 18 are made of wood which had been "cured" in oil, thereby reducing the friction on the saw to the minimum.

I claim as my invention:

1. A top guide for band saws comprising a housing, a guide block holder slidably mounted in said housing, a plurality of individually adjustable guide blocks mounted in said holder and a guide block at one end of said holder arranged for engagement with the back of the band saw.

2. A top guide for band saws comprising a housing open at its front and having a slot in its rear wall, a guide block holder slidably mounted in said housing and biased toward its forward position, a plurality of individually adjustable guide blocks mounted in said holder, means extending through the rear wall of said holder and projecting through said longitudinal slot in the housing for adjusting said blocks and a guide block mounted in said holder arranged for engagement with the back of the band saw.

In witness whereof, I JOSEPH W. CAUSEY, have hereunto set my hand at Electric Mills, Mississippi, this 12th day of Feby., A. D. one thousand nine hundred and twenty-seven.

JOSEPH W. CAUSEY.